United States Patent [19]

Sykes

[11] Patent Number: 4,496,048

[45] Date of Patent: Jan. 29, 1985

[54] VIDEO CASSETTE CARRIER

[75] Inventor: Philip K. Sykes, Maple Grove, Minn.

[73] Assignee: Blackbourn, Inc., Eden Prairie, Minn.

[21] Appl. No.: 448,954

[22] Filed: Dec. 13, 1982

[51] Int. Cl.³ .................... B65D 85/67; B65D 85/672
[52] U.S. Cl. .................... 206/387; 220/339; 206/472
[58] Field of Search .................. 206/387, 45.13, 45.11, 206/472; 220/339, 375

[56] References Cited

U.S. PATENT DOCUMENTS

| D. 220,989 | 6/1971 | Di Ioia. | |
|---|---|---|---|
| 644,623 | 3/1900 | Mueller. | |
| 1,960,073 | 5/1934 | Warner | 206/45.13 |
| 3,737,067 | 6/1973 | Palson | 206/387 |
| 3,876,071 | 4/1975 | Neal et al. | 206/387 |
| 4,011,940 | 3/1977 | Neal et al. | 206/1.5 |
| 4,054,206 | 10/1977 | Kobayashi et al. | 206/387 |
| 4,078,657 | 3/1978 | Schurman | 206/387 |
| 4,102,452 | 7/1978 | Sato et al. | 206/387 |
| 4,183,443 | 1/1980 | Kroner | 206/257 |
| 4,184,594 | 1/1980 | Hehn | 206/387 |
| 4,196,806 | 4/1980 | Posso | 206/387 |
| 4,231,474 | 11/1980 | Takahashi | 206/387 |
| 4,235,334 | 11/1980 | Ahn | 206/387 |
| 4,253,568 | 3/1981 | Long et al. | 206/387 |
| 4,291,801 | 9/1981 | Basili et al. | 206/387 |
| 4,303,159 | 12/1981 | Stone et al. | 206/387 |
| 4,314,637 | 2/1982 | Posso | 206/387 |
| 4,322,000 | 3/1982 | Struble | 220/339 |
| 4,341,307 | 8/1982 | Shyers | 206/387 |
| 4,363,403 | 12/1982 | Raucci, Jr. et al. | 206/387 |
| 4,365,711 | 12/1982 | Long et al. | 206/387 |
| 4,368,817 | 1/1983 | Temesrary | 206/387 |
| 4,369,879 | 1/1983 | Egly et al. | 206/45.18 |

FOREIGN PATENT DOCUMENTS 2486495  1/1981  France .................. 220/339

Primary Examiner—William T. Dixson, Jr.
Assistant Examiner—Brenda J. Ehrhardt
Attorney, Agent, or Firm—Merchant, Gould, Smith, Edell, Welter & Schmidt

[57] ABSTRACT

The specification discloses an album type package (10) for holding a magnetic tape cassettes, and particularly either of two different predetermined sizes of video cassettes (28). The package (10) includes covers (12, 14) hinged to opposite sides of a spine (16), on which is mounted a rectangular boot or tray (26) for receiving a cassette in edgewise relationship therein. A lug (36) on the back cover (14) positively retains the cassette in the tray (26) when the cover is releasably secured by a lock (30) to the tray and the package (10) is partially closed. Means (44) are provided for properly locating a second, relatively smaller cassette for engagement with the lug (36). Another lock (38) releasably secures the covers (12, 14) in fully closed position.

11 Claims, 5 Drawing Figures

VIDEO CASSETTE CARRIER

TECHNICAL FIELD

The present invention relates generally to a storage container for tape cassettes, and more particularly to an album type package adapted to hold either of two different predetermined sizes of video cassettes in positively retained relationship even when the package is partially opened.

BACKGROUND ART

Magnetic tape cassettes are utilized in a variety of applications for recording information. Such cassettes typically include a rigid case enclosing a pair of rotatable reels and structure for guiding the tape between the reels and past an opening along one edge of the case. Access holes are provided in the sides of the case for driving the reels, which are relatively loosely mounted for rotation as well as for some lateral movement to facilitate engagement with the drive mechanisms of various types of tape recorders/players. For this reason, vibration or shock during transportation and handling can cause the reels to rotate somewhat and thus expose the tape to damage. It will be appreciated that magnetic tape is relatively delicate and easily damaged.

A variety of containers or packages have been developed to constrain the tape reels against movement, as well as to protect the cassettes and tape therein from shock and dust. For example, U.S. Pat. No. 3,272,325 discloses a container having a generally rectangular pouch secured to a flat lid. Pivoted to the pouch is a cooperating cover with two inwardly projecting lugs which are adapted to engage the open centers of hubs or the tape reels when the container is closed. With the container open, a cassette is inserted into the pouch and the two sides of the container are rotated to a closed position to form a generally rectangular box enclosing the cassette.

U.S. Pat. Nos. 4,314,637, 4,235,334, 4,102,452 show other forms of containers having fixed lugs on one pivotal cover for engaging the reels of the cassette. Various types of spring activated lugs are utilized in the packages shown in U.S. Pat. Nos. 4,231,474, 4,078,657, 4,054,206, 4,011,940, 3,876,071.

More recently, with the increasing popularity of video cassette recorders, containers have been developed which are specifically designed to hold video cassettes. Video cassettes are generally larger and more expensive than regular audio cassettes, but are also available in several sizes and are still susceptible to unwinding of the tape caused by shock or vibration during transport if the tape reels are not sufficiently immobilized. Some of the containers shown in the patents mentioned above may be utilized with specific types of video cassettes.

Since the vast majority of video cassettes in use today are of either the Beta or VHS types, there have been some attempts to develop packages which will accommodate either type of these cassettes. This has been complicated by the fact the overall sizes of these cassettes are different, as are the distances between the access openings to their reels. For example, the cases showing in U.S. Pat. Nos., 4,291,801 and 4,184,594, both rely on interference fits between projections on the inside covers of one side of the cases and the access openings and/or reel openings of the cassettes. If these cases are opened improperly, the cassettes therein can easily fall out and become damaged. U.S. Pat. No. 4,303,159 shows a case which requires a separate insert for storing a relatively smaller video cassette but provides no means whatsoever for inhibiting rotation of the tape reels.

A need has thus developed for an improved video cassette case which will hold either one of two different sizes of video cassettes in positively secured relationship therein when the case is fully closed or only partially closed.

SUMMARY OF INVENTION

The present invention comprises a tape cassette case which overcomes the foregoing and other difficulties associated with the prior art. In accordance with the invention, there is provided a package for magnetic tape cassettes, particularly video cassettes, comprising an album with front and back covers hinged to opposite sides of a spine. Mounted on the spine is a rectangular boot or tray dimensioned to receive a cassette in edgewise relationship therein. Means are provided for releasably securing the back cover to the tray such that the package is partially closed. When the package is thus partially closed, a lug on the back cover engages a tape reel to positively retain the cassette therein even when the case is not fully closed. The interior of the tray is configured for properly locating a seond, relatively smaller cassette relative to the lug on the back cover. A latch is provided on the covers to secure the package completely closed. In the preferred embodiment, spacers are provided on the inside surfaces of the covers for stablization and shock isolation.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
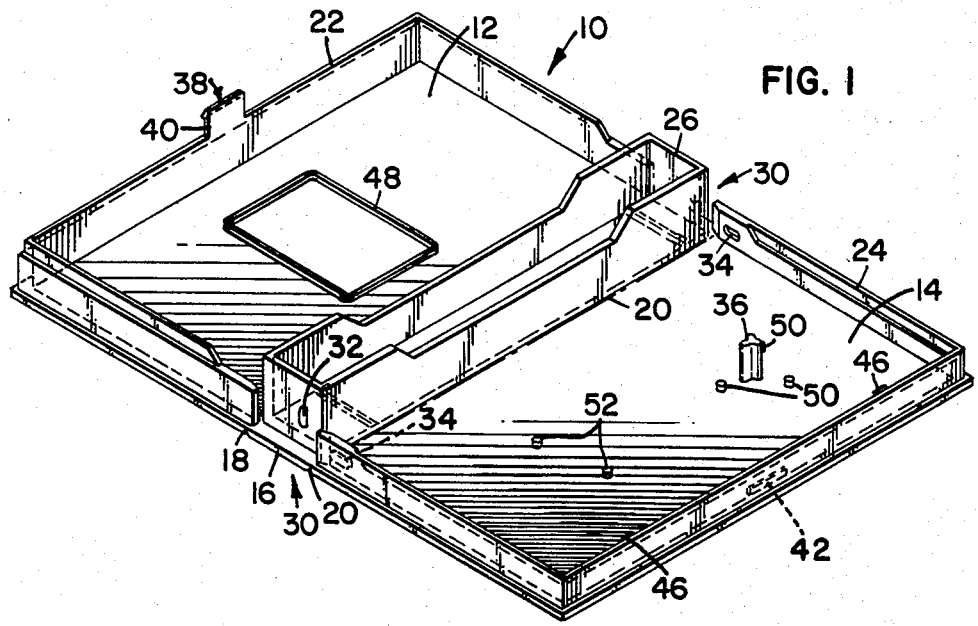
FIG. 1 is a perspective view of the package incorporating the invention, shown in a fully open position without a cassette therein.
Figure 2:
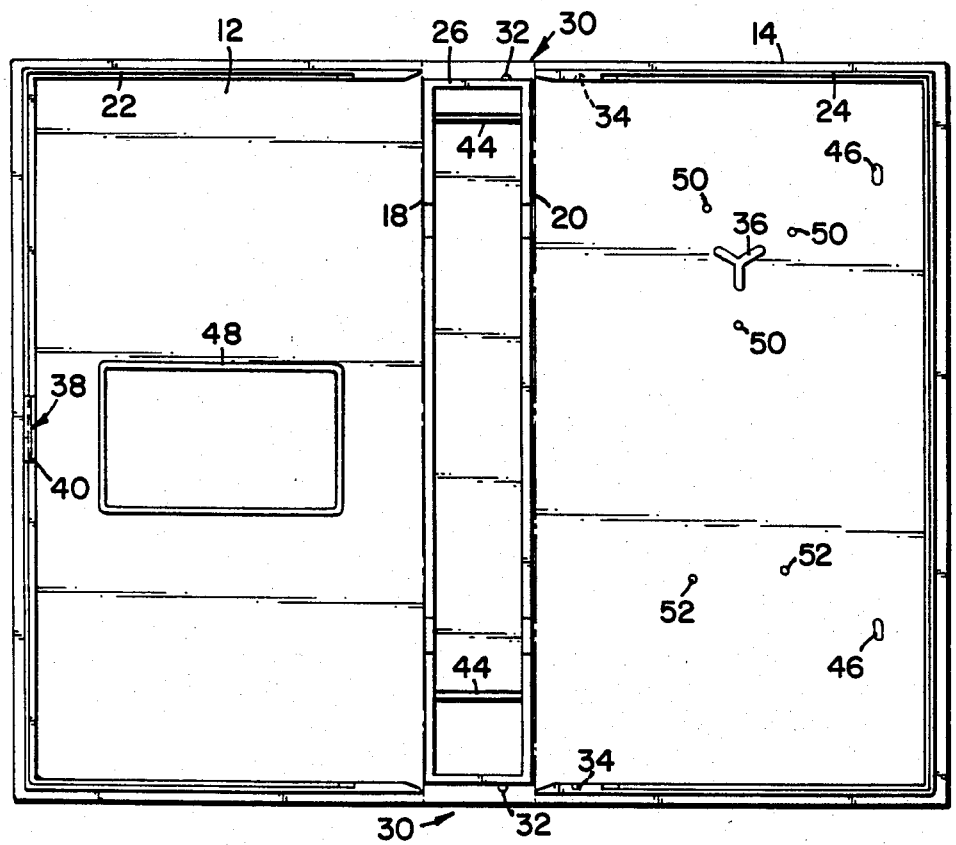
FIG. 2 is a plan view of the package in a fully open position.

Referring now to the Drawings, wherein like reference numerals designate like or corresponding elements throughout the views, there is shown a cassette carrier or package 10 incorporating the invention. As illustrated, the package 10 is adapted for use with video cassettes, and is particularly adapted for use with either the Beta or VHS cassettes, which are of different sizes and are the two most popular types of video cassettes in use today. It will be appreciated, however, that package 10 can also be adapted for use with various other types of magnetic tape cassettes. As will be explained more fully hereinafter, the package 10 utilizes a double locking arrangement to positively secure the cassette therein even when the package is partially opened or not fully closed so that the cassette will not drop out if the package is inadvertently opened improperly.

The package 10 is in the form of an album having a front cover 12, a back cover 14, and an intermediate back or spine 16. The front cover 12 is connected by a hinge 18 to one side of the spine 16, and the back cover 14 is connected to the opposite side of the spine by a hinge 20. In accordance with the preferred construction, the package 10 is molded as an integral unit from suitable plastic, such as polypropylene resin with the hinges 18 and 20 being of the type commonly known as "living" hinges integrally formed therein. It will thus be apparent, that covers 12 and 14 are pivotal between open and closed positions relative to the spine 16 and cooperate therewith to form a substantially rigid case for enclosing a cassette therein.

An upstanding wall or flange 22 is provided on the inside surface of the front cover 12 about three sides thereof. A similar upstanding wall or flange 24 is provided on the inside surface of the back cover 14. Flanges 22 and 24 are preferably configured for partial overlapping engagement when the package 10 is closed in order to provide a substantially dust proof seal. As illustrated, a lip is provided about the flange 22 and a complementary recess is provided on the opposite flange 24 for this purpose, although this particular configuration and order is not critical to practice of the invention. Other suitable complementary configurations can be used if desired.

Figure 3:
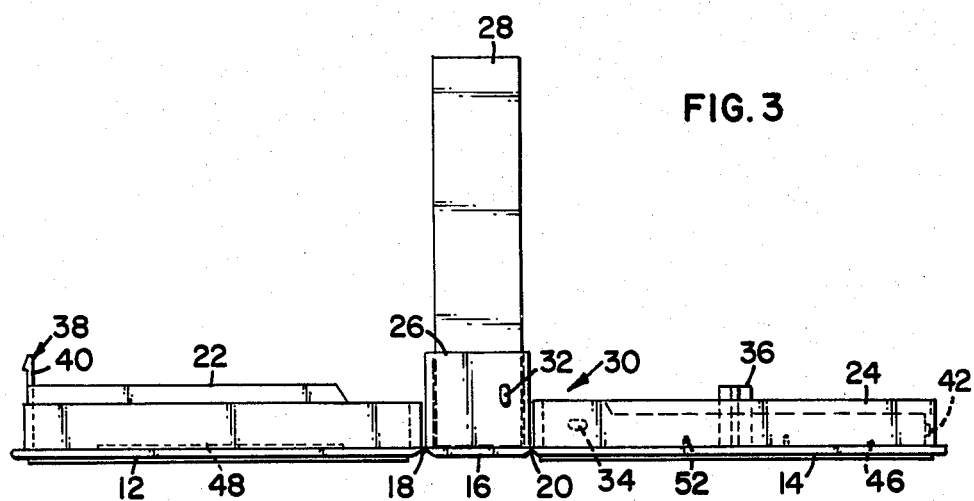
FIG. 3 is a side view of the package in a fully open position with a cassette inserted therein.
Figure 4:
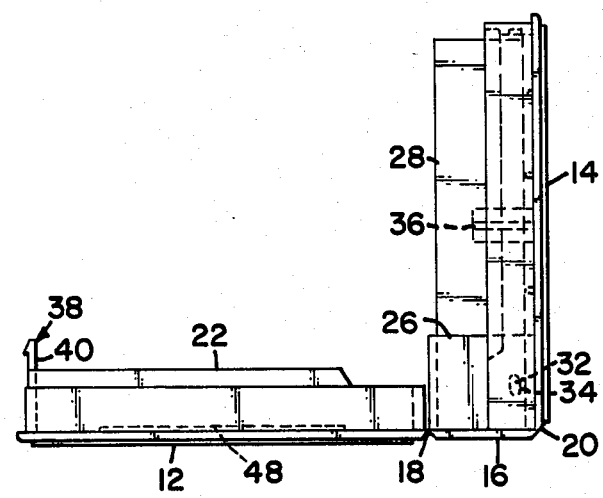
FIG. 4 is a side view of the package in a partially closed position.
Figure 5:
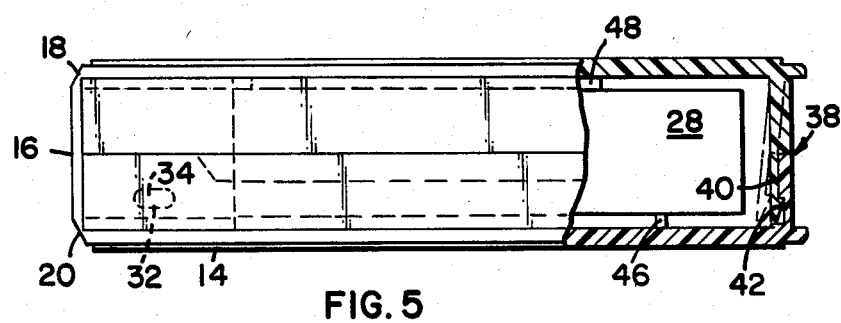
FIG. 5 is enlarged end view (partially cut away) of the package in a fully closed position.

A rectangular boot or tray 26 is mounted on the inside surface of the spine 16. The tray 26 is dimensioned to receive a video cassette 28, as is best seen in FIGS. 3 and 4, in edge-wise relationship therein with its tape door down against the spine 16. Provision of the tray 26 on the inside surface of spine 16 comprises an important feature of the invention.

Another important feature of the invention comprises the provision of two releasable locks for retaining the package 10 closed. A first releasable lock 30 is provided at each end of the tray 26 for securing the back cover 14 thereto such that the package is partially closed. As illustrated, each lock 30 comprises a detent-type lock with a raised rib 32 formed on the tray 26 and a corresponding recess 34 on the adjacent part of flange 24.

Locks 30 thus enable the back cover 14 to be releasably secured to the tray 26 to partially close package 10. When so partially closed, as illustrated in FIG. 4, a lug 36 on the inside surface of the back cover 14 engages the open hub of a tape reel of the cassette 28. Lug 26 is preferably of triangular or star-shaped cross-section as shown in order to engage tangs on the hub of the tape reel and thus prevent it from rotating. Lug 36 both positively secures the tape against unwinding, and positively secures the cassette 28 within the tray 26 such that it cannot fall out or be removed until the package 10 is fully opened.

A second releasable lock 38 is provided for securing the covers 12 and 14 in fully closed relationship. As illustrated, the lock 38 comprises a press type latch 40 on the flange 22 of the front cover 12, and a corresponding recess 42 on the flange 24 of the back cover 14. The lock 38 is preferably formed as an integral part of the package 10, as is lock 30.

It will thus be apparent that the lock 38 is first disengaged so that the front cover 12 can be pivoted away from the spine 16 and tray 26 to partially open the package 10, after which the locks 30 must be disengaged so that the back cover 14 can be opened to release the cassette 28 for removal from the package. Cassette 28 is not released until the back cover 14 is opened, being held in the tray 26 by lug 36. Thus, even if the package 10 is upside down when the front cover 12 is opened, the cassette 28 will remain secured in tray 26 until the back cover 14 is opened. Locks 30 cannot be released until after lock 38 has been disengaged.

In accordance with the preferred embodiment, a pair of transverse ribs 44 are provided within tray 26 on the inside surface of the spine 16 for locating another, relatively smaller cassette, such as a Beta type video cassette, in proper position for engagement with lug 36.

The preferred embodiment of package 10 also includes various spacers and retainers on the insides of covers 12 and 14. A pair of raised ribs 46 can be provided on the inside of the back cover 14, as can a raised collar 48 on the inside of the front cover 12. Ribs 46 and collar 48 function as spacers to engage opposite sides of the cassette 28 when package 10 is closed, thereby providing additional stabilization and shock isolation. The collar 48 also serves as a convenient place for a label, name plate or the like.

A circular array of projections or pins 50 can be provided on the inside of the back cover 14 around the lug 36 for engaging the access opening in the case of the cassette 28 for the real therein that is engaged by the lug. As illustrated, the three pins 50 are arranged circularly in the eleven, two and six o'clock positions. Similarly, another array of projections or pins 52 can be provided on the inside surface of the back cover 14 for engaging the other reel access opening in the cassette 28 to limit pivotal movement of the cassette about lug 36 and bouncing thereof inside the package 10 during transport. The purpose of pins 50 and 52 is thus to further stabilize the cassette 28 and minimize movement thereof inside the closed package 10.

From the foregoing, it will thus be apparent that the present invention comprises an improved video cassette package having several advantages over the prior art. The package can accommodate either of two different predetermined sizes of cassettes without any adjustment, modification or the addition of an insert. The package incorporates two separate releasable locks, the first of which secures the covers together in fully closed position, and the second of which secures the back cover to a tray on the spine such that the cassette therein cannot fall out or be removed until the package is fully opened. Other advantages will be evident to those skilled in the art.

Although particular embodiments of the invention have been illustrated in the accompanying Drawings and described in foregoing Detailed Description, it will be understood that the invention is not limited to the specific embodiments disclosed, but is intended to embrace any equivalents, alternatives, modifications and/or rearrangements of elements falling within the scope of the invention as defined by the following claims.

I claim:

1. An album type package for a cassette including at least one tape reel therein, which comprises:
   an elongate spine having inside and outside surfaces;
   first and second covers connected to opposite edges of said spine being individually pivotal between open and closed positions relative to said spine, said covers each having inside and outside surfaces;
   rectangular boot means secured to the inside surfaces of said spine for receiving the cassette in edge-wise relationship therein and substantially constraining the cassette against longitudinal and lateral movement relative to said spine;

means releasably securing said second cover to said boot means in a closed position;

means mounted on said second cover for constraining the cassette against movement out of said boot means when said second cover is closed; and means releasably securing said first cover to said second cover in a closed position so that the package is fully closed.

2. The package of claim 1, wherein the package is of integral molded plastic construction.

3. The package of claim 1, wherein said cassette constraining means includes a lug mounted on the inside surface of said second cover, and adapted to engage a tape reel within the cassette.

4. The package of claim 3, further including:

first and second peripheral flanges on the inside surfaces of said first and second covers, respectively, said flanges being adapted to form a substantially dust-proof seal about the cassette when said covers are fully closed.

5. The package of claim 1, further including:

spacer means on the inside surfaces of said first and second covers for engaging opposite sides of the cassette when said covers are fully closed.

6. The package of claim 1, further including:

means positioned within said boot means for longitudinally locating a relatively smaller cassette for engagement with said constraining means.

7. An album type package for a cassette including at least one tape reel therein, which comprises:

an elongate spine having inside and outside surfaces;

first and second covers connected to opposite edges of said spine being individually pivotal between open and closed positions relative to said spine, said covers each having inside and outside surfaces;

rectangular boot means secured to the inside surface of said spine for receiving the cassette in edge-wise relationship therein and substantially constraining the cassette against longitudinal and lateral movement relative to said spine;

means releasably securing said second cover to said boot means in a closed position;

a lug mounted on the inside surface of said second cover for engaging the tape reel within the cassette and thereby constraining the cassette against movement out of said boot means when said second cover is partially closed;

means positioned within said boot means for longitudinally locating a relatively smaller cassette for engagement with said lug; and means releasably securing said first cover to said second cover in a closed position so that the package is fully closed.

8. The package of claim 7, further including:

first and second peripheral flanges on the inside surfaces of said first and second covers, respectively, said flanges being adapted to form a substantially dust-proof seal about the cassette when said covers are in closed positions and the package is fully closed.

9. The package of claim 7, further including:

spacer means on the inside surfaces of said first and second covers for engaging opposite sides of the cassette when said covers are in closed positions and the package is fully closed.

10. The package of claim 7, wherein the cassette includes a case with an access opening for each tape reel therein, and further including:

means mounted on said second cover for engaging the access opening of the cassette when said second cover is in a closed position to further limit movement of the cassette within the package.

11. An album type package for a cassette including at least one tape reel therein, which comprises:

an elongate spine having inside and outside surfaces;

first and second covers connected to opposite edges of said spine being pivotal between open and closed positions relative to said spine, said covers each having inside and outside surfaces with complementary flanges on the inside surfaces for defining a peripheral wall when said covers are closed;

rectangular boot means secured to the inside surfaces of said spine for receiving the cassette in edge-wise relationship therein and substantially constraining the cassette against longitudinal and lateral movement relative to said spine;

rib and detent means releasably securing said second cover to said boot means in a closed position;

means mounted on said second cover for constraining the cassette against movement out of said boot means when said second cover is closed;

means positioned within said boot means for longitudinally locating a relatively smaller cassette for engagement with said constraining means;

press-type latch means releasably securing said first cover to said second cover in a closed position so that the package is fully closed; and spacer means mounted on the inside surfaces of said first and second covers for engaging opposite sides of the cassette received in said boot means when said covers are closed.

* * * * *